United States Patent
Dapolito

[11] 3,743,047
[45] July 3, 1973

[54] DOOR-OPERATED BRAKE FOR AUTOMOBILES

[75] Inventor: August A. Dapolito, Jersey City, N.J.

[73] Assignee: Michael A. Marchisano, Long Island City, N.Y.; a part interest

[22] Filed: Sept. 15, 1970

[21] Appl. No.: 72,404

[52] U.S. Cl. ............... 180/111, 188/110, 188/167, 180/112
[51] Int. Cl. .................................................. B60t 7/12
[58] Field of Search ...... 180/111, 112, 113; 188/166, 188/167; 296/146

[56] References Cited
UNITED STATES PATENTS

| | | |
|---|---|---|
| 3,040,831 | 6/1962 | Farber.................180/111 |
| 3,305,042 | 2/1967 | Thorner.................180/111 X |
| 2,945,546 | 7/1960 | Niederoest................180/111 |

*Primary Examiner*—Benjamin Hersh
*Assistant Examiner*—John P. Silverstrim
*Attorney*—Anthony J. Castorina

[57] ABSTRACT

The emergency or parking brake of a vehicle is biased by a spring means to the active or "on" position. When the automobile door adjacent the driver's seat is closed, the spring means is rendered ineffective, but whenever the door is opened, the spring means is able to apply the brake automatically for the purpose of avoiding accidents.

4 Claims, 2 Drawing Figures

PATENTED JUL 3 1973　　3,743,047

INVENTOR
AUGUST A. DAPOLITO

BY *Anthony J. Castrisos*

ATTORNEY

DOOR-OPERATED BRAKE FOR AUTOMOBILES

Automobile safety brakes including door-operated emergency or parking brakes are known in the prior art and one example of the art is contained in U. S. Pat. No. 2,945,546 to Niederoest. The structure in this patent and the prior art in general tends to be unduly complex and costly and involves quite a number of parts which must be installed on the automobile and adjusted. Consequently, as yet there has been no adoption by the industry of the important safety feature contemplated in the prior art patents and in the present invention.

The object of the invention, therefore, is to provide a safety brake attachment of the type mentioned which is wholly practical and substantially fool-proof and which may be manufactured and installed with the utmost economy, requiring the fewest possible number of parts and the least modification of the automobile structure. The attachment does not interfere with the normal manually operated parking brake or its release means and the device is adjustable in a simple manner so as to be applicable to a variety of automobile makes. Other features and advantages will appear during the course of the following description.

BRIEF DESCRIPTION OF DRAWING FIGURES

DETAILED DESCRIPTION

Figure 1:
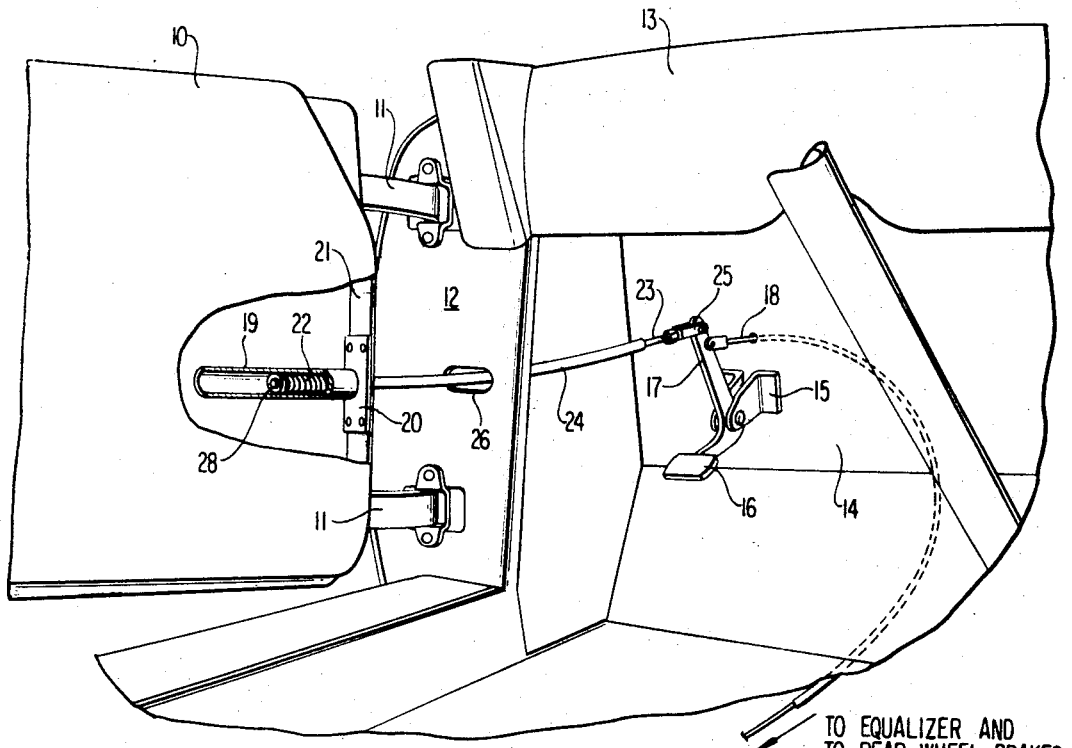
FIG. 1 is a perspective view of a door-operated safety or parking brake for automobiles.

Referring to the drawings in detail wherein like numerals designate like parts throughout the same, the numeral 10 designates an automobile door adjacent the driver's seat having the usual hinges 11 whose supports are firmly anchored to the vertical door frame portion 12 immediately in advance of the door. The instrument panel is indicated at 13 and the vehicle fire wall 14 has mounted thereon a bracket 15 which pivotally supports an emergency or parking brake pedal 16 having an upward arm extension or crank 17. A cable 18 is connected with the arm 17, as shown, and leads rearwardly beneath the floor of the vehicle to an equalizer which is connected to the rear wheel brakes. In some cases, the cable 18 may be operatively connected to a drive shaft brake. Hand-operated means, not shown, are usually provided beneath the instrument panel 13 to release the parking brake upon entry into the automobile. These mechanisms vary depending upon the make of automobile and the invention herein is not limited to a particular make and it is not necessary for a proper understanding of the invention to illustrate in detail the conventional release means for the parking brake, or other conventional structures. Suffice it to say that the pivoted element 17 to which the invention proper attaches is present on most vehicles in one form or another so that the invention is applicable to most vehicles.

The invention proper is extremely simplified and comprises a straight rigid cylindrical tube 19 having a rigid mounting plate 20 at its forward end adapted to be secured by screws or the like to the frontal edge panel 21 of the hinged door. The rear end of the tube 19 is open. The tube is disposed in a concealed manner within the interior of the hollow door which is equipped with the conventional interior decorative removable access panel.

Within the tube 19 is a compressible coil spring 22 whose force serves to apply the parking brake automatically when the door is open and also serving as a lost motion connection between the door and brake pedal. Thus the spring 22 serves a dual function in the invention.

A cable 23 having a protective sheath 24 has its forward end adjustably connected to the pivoted arm 17 by an adjustable clevis 25, as shown in FIG. 1. The cable and sheath extend through openings 26 and 27 in the frame portion 12 and mounting plate 20 and at the rear end of the cable a button element 28 is anchored to the cable and bears against the rear end of the compression spring 22, whose forward end abuts the plate 20. There is a clearance between the button 28 and the bore of the tube 19 which functions as a guide.

If the drive should forget to depress the foot pedal 16 after parking the automobile, thereby failing to apply the parking brakes, and then leave the automobile, in conventional circumstances, the car could move and an accident could occur. The purpose of the invention is to prevent this. Assuming that the driver does overlook depressing the foot pedal 16 and then opens the door 10 to leave the vehicle, the swinging action of the door with the tube 19 and plate 20 will compress the spring 22 and create therein energy more than sufficient to apply the emergency brake by pulling on the cable 23 and swinging the arm 17 rearwardly to thereby apply the brakes by movement of the cable 18. When the door is closed and the tube 19 returns into parallelism with the normal axis of the cable, the spring 22 will expand in the tube 19 but will still be under some tension sufficient to maintain the brake active in any event. In most cases, there will be a ratchet mechanism, not shown, which will keep the emergency brake locked in the active position once applied. The driver, upon returning to the automobile, may open the door in the normal manner and the spring 22 will compress axially without disturbing the brake, which is still in the "on" position, and after closing the door, the driver can release the brake with the usual release means, not shown.

Figure 2:
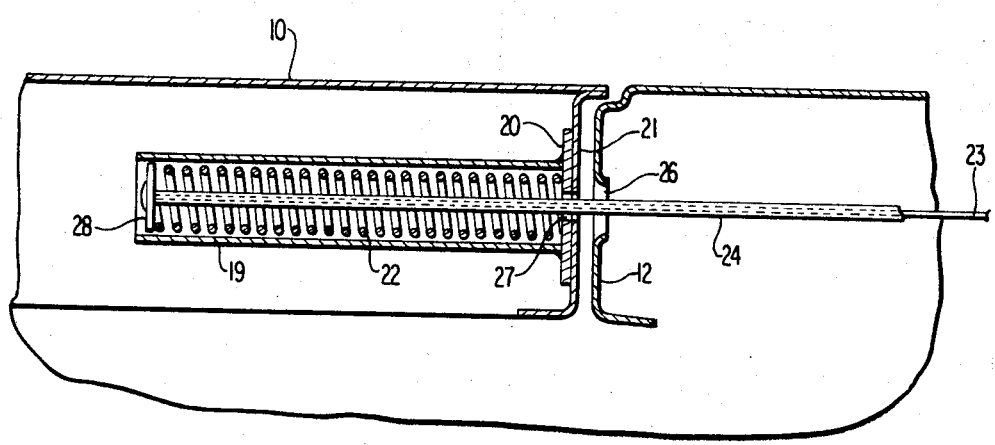
FIG. 2 is an enlarged fragmentary horizontal section through the vehicle door and a portion of the brake applying mechanism.

As stated, the spring serves two purposes, it stores energy whenever the door is open to automatically apply the emergency brake and to maintain it applied even when the door is closed. The spring is compressed when the door is open, FIG. 1, and it is still compressed when the door is closed, FIG. 2, although to a lesser extent. Secondly, the spring forms a convenient lost motion connection between the door 10 and the arm 17 so that the cable means will not sag loosely at any time. The clevis 25 permits adjustment and the terminal end of the cable carries a threaded member of any desired length.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A door-controlled safety brake mechanism for automobiles comprising a substantially horizontally disposed guide tube mountable in the interior of an automobile door and provided at one end with a mounting plate adapted for attachment to a front edge flange of the door, said mounting plate having a central opening, a compressible coil spring slightly smaller than the bore of the tube within the tube and having one end bearing against said mounting plate, a somewhat flexible cable extending forwardly through the bore of the spring through the opening of the mounting plate and through a passageway of the door frame, a button element secured to the rear end of the cable and bearing on the corresponding end of the spring remote from the mounting plate, and means for attaching the forward end of the cable to a pivoted emergency brake setting member within the automobile forwardly of the door and door opening, wherein the opening of the door will cause the cable to actuate the brake setting member to a brake on position.

2. The structure as defined by claim 1, and a protective sheathing on the cable substantially for its entire length.

3. The structure as defined by claim 1, and the rear end of said tube being open, said spring storing energy to set the emergency brake when the door is opened and also serving as a lost motion connection between the door and said brake setting member.

4. A door-controlled safety brake mechanism as claimed in claim 1 wherein said means for attaching the forward end of the cable comprises an adjustable clevis on the forward end of the cable adapted for attachment to said brake setting member.

* * * * *